US012449011B2

(12) United States Patent
Giammarinaro et al.

(10) Patent No.: US 12,449,011 B2
(45) Date of Patent: Oct. 21, 2025

(54) BRAKING BAND OF A DISK FOR DISK BRAKE

(71) Applicant: BREMBO S.p.A., Curno (IT)

(72) Inventors: Salvatore Giammarinaro, Curno (IT); Stefano Medici, Curno (IT); Simone Biondo, Curno (IT); Fabiano Carminati, Curno (IT)

(73) Assignee: Brembo S.p.A., Curno (IT)

( * ) Notice: Subject to any disclaimer, the term of this patent is extended or adjusted under 35 U.S.C. 154(b) by 433 days.

(21) Appl. No.: 17/757,574

(22) PCT Filed: Dec. 15, 2020

(86) PCT No.: PCT/IB2020/061963
§ 371 (c)(1),
(2) Date: Jun. 17, 2022

(87) PCT Pub. No.: WO2021/124100
PCT Pub. Date: Jun. 24, 2021

(65) Prior Publication Data
US 2023/0018275 A1   Jan. 19, 2023

(30) Foreign Application Priority Data
Dec. 20, 2019   (IT) .................. 102019000025090

(51) Int. Cl.
F16D 65/12   (2006.01)
C23C 4/08    (2016.01)
(Continued)

(52) U.S. Cl.
CPC ............. F16D 65/127 (2013.01); C23C 4/08 (2013.01); C23C 4/10 (2013.01); C23C 4/129 (2016.01);
(Continued)

(58) Field of Classification Search
None
See application file for complete search history.

(56) References Cited

U.S. PATENT DOCUMENTS 2,255,024 A    9/1941  Eksergian
4,248,915 A *  2/1981  Vinciguerra ........... B05D 5/086
                                                    427/292
(Continued)

FOREIGN PATENT DOCUMENTS

DE   102007023418 A1   11/2008
DE   102008022225 A1   11/2009
(Continued)

OTHER PUBLICATIONS

European Patent Office, International Search Report, issued in PCT/IB2020/061963, Feb. 22, 2021, Rijswijk, NL.

*Primary Examiner* — Robert A. Siconolfi
*Assistant Examiner* — James K Hsiao
(74) *Attorney, Agent, or Firm* — Marshall & Melhorn, LLC

(57) ABSTRACT

A braking band having an annular band body arranged around a rotation axis and made of one of gray cast iron, steel, aluminum or alloys thereof, has at least one braking surface having an activated band body portion for increasing adhesive capacity of at least one protective surface coating placed on the surface of the activated band body portion and having at least one material with elevated resistance to abrasion. The activated band body portion is arranged on the surface of the annular band body to form an outermost layer of the braking band with the at least one protective surface coating and has a rough profile having at least one channel delimited by at least one pair of projections, extending along a path at least partially surrounding the rotation axis and having a channel bottom and a first channel side forming an (Continued)

acute angle with the channel bottom and an opposite second channel side forming an obtuse angle with the channel bottom.

13 Claims, 6 Drawing Sheets

(51) Int. Cl.
| | |
|---|---|
| *C23C 4/10* | (2016.01) |
| *C23C 4/12* | (2016.01) |
| *C23C 4/129* | (2016.01) |
| *C23C 8/02* | (2006.01) |
| *C23C 8/32* | (2006.01) |
| *C23C 24/04* | (2006.01) |
| *C23C 28/00* | (2006.01) |
| *F16D 69/02* | (2006.01) |
| *F16D 65/02* | (2006.01) |
| *F16D 69/00* | (2006.01) |
| *F16D 69/04* | (2006.01) |

(52) U.S. Cl.
CPC ............... *C23C 8/02* (2013.01); *C23C 8/32* (2013.01); *C23C 24/04* (2013.01); *C23C 28/322* (2013.01); *C23C 28/341* (2013.01); *F16D 65/123* (2013.01); *F16D 65/125* (2013.01); *F16D 69/027* (2013.01); *F16D 2065/132* (2013.01); *F16D 2069/001* (2013.01); *F16D 2069/003* (2013.01); *F16D 2069/004* (2013.01); *F16D 2069/0483* (2013.01); *F16D 2069/0491* (2013.01); *F16D 2200/0008* (2013.01); *F16D 2200/0026* (2013.01); *F16D 2200/0078* (2013.01); *F16D 2250/0046* (2013.01); *F16D 2250/0092* (2013.01)

(56) References Cited

U.S. PATENT DOCUMENTS

| | | | |
|---|---|---|---|
| 4,715,486 A | 12/1987 | Burgdorf et al. | |
| 5,380,564 A * | 1/1995 | VanKuiken, Jr. | C23C 4/02 427/455 |
| 5,422,150 A * | 6/1995 | Scoular | B32B 15/18 428/420 |
| 5,558,922 A * | 9/1996 | Gupta | C23C 14/5873 428/167 |
| 5,806,636 A * | 9/1998 | Atmur | F16D 69/028 188/218 XL |
| 6,290,032 B1 * | 9/2001 | Patrick | C23C 4/08 188/218 XL |
| 6,528,118 B2 * | 3/2003 | Lee | C23C 14/042 427/272 |
| 7,220,458 B2 * | 5/2007 | Hollis | C23C 4/02 427/446 |
| 7,261,192 B2 * | 8/2007 | Khambekar | F16D 65/127 188/218 XL |
| 8,877,296 B2 * | 11/2014 | Lembach | F16D 65/127 427/451 |
| 9,618,066 B2 * | 4/2017 | Schoepf | B23P 13/00 |
| 9,643,265 B2 * | 5/2017 | Ast | B23D 37/22 |
| 9,713,912 B2 * | 7/2017 | Lee | C23C 28/3455 |
| 9,879,740 B2 * | 1/2018 | Tironi | C23C 24/04 |
| 10,040,094 B2 * | 8/2018 | Lazur | C04B 41/50 |
| 10,082,187 B2 * | 9/2018 | Stephenson | F16D 65/125 |
| 11,788,593 B2 * | 10/2023 | Carminati | C23C 4/08 188/218 XL |
| 2005/0221057 A1 * | 10/2005 | Hollis | C23C 14/028 427/372.2 |
| 2008/0000550 A1 * | 1/2008 | Holly | C21D 1/607 148/318 |
| 2011/0056777 A1 * | 3/2011 | Woychowski | F16D 65/12 188/218 XL |
| 2011/0147205 A1 * | 6/2011 | Guay | C23C 28/345 204/290.01 |
| 2013/0133995 A1 * | 5/2013 | Hanna | F16D 65/12 188/218 XL |
| 2013/0295375 A1 * | 11/2013 | Ernst | B32B 15/012 188/218 XL |
| 2013/0333989 A1 * | 12/2013 | Oezer | F16D 65/127 188/218 XL |
| 2014/0000996 A1 * | 1/2014 | Schoepf | F16D 65/127 188/218 XL |
| 2014/0102592 A1 * | 4/2014 | Nishikawa | C23C 8/80 148/318 |
| 2015/0082850 A1 * | 3/2015 | Flores | B24B 7/00 72/252.5 |
| 2016/0178019 A1 * | 6/2016 | Stephenson | F16D 65/127 188/218 XL |
| 2017/0122392 A1 * | 5/2017 | Lembach | F16D 69/04 |
| 2017/0363167 A1 * | 12/2017 | Csanadi | B22F 7/04 |
| 2019/0056003 A1 * | 2/2019 | Carminati | F16D 65/125 |
| 2022/0065313 A1 * | 3/2022 | Carminati | C23C 4/02 |
| 2022/0403901 A1 * | 12/2022 | Heinecke | F16D 65/125 |
| 2024/0247360 A1 * | 7/2024 | Bracci | C23C 30/00 |

FOREIGN PATENT DOCUMENTS

| | | |
|---|---|---|
| DE | 102009003161 A1 | 11/2010 |
| DE | 102010052735 A1 | 11/2011 |
| DE | 102011056307 A1 | 6/2013 |
| EP | 1854903 A1 | 11/2007 |
| EP | 2518362 A1 | 10/2012 |
| WO | 2014097186 A1 | 6/2014 |
| WO | 2014097187 A2 | 6/2014 |
| WO | 2017046681 A1 | 3/2017 |

* cited by examiner

BRAKING BAND OF A DISK FOR DISK BRAKE

CROSS-REFERENCE TO RELATED APPLICATIONS

This application is a National Phase Application of PCT International Application No. PCT/IB2020/061963, having an International Filing Date of Dec. 15, 2020 which claims priority to Italian Application No. 102019000025090 filed Dec. 20, 2019, each of which is hereby incorporated by reference in its entirety.

Field of the Invention

The present invention relates to a braking band and a disk for disk brake, particularly, but not exclusively, for applications in the automobile field, and a vehicle having said ventilated disk.

Prior Art

In a disk brake, the brake caliper is generally arranged straddling the outer peripheral margin of a brake disk, adapted to rotate about a rotation axis (A-A) defining an axial direction (X-X). In a brake disk, a radial direction (R-R) is further defined, substantially orthogonal to said axial direction (X-X), and a circumferential direction (C-C), orthogonal to said axial direction (X-X), to said radial direction (R-R) and locally a tangential direction (T-T), or rather accurately, i.e. in intersection points of an axial and radial direction, orthogonal to both said axial direction (X-X) and said radial direction (R-R).

As known, disks for disk brake comprise a bell adapted to associate the disk with a hub of a vehicle, from which an annular portion, named a braking band, which is intended to cooperate with brake pads of a caliper, extends. In the case of disks of ventilated type, the braking band is made by means of two plates facing and connected to each other by means of connecting elements, respectively, e.g. in the shape of pins or fins. The outer surfaces of the two plates define opposite braking surfaces, while the inner surfaces, together with the pins or fins, delimit ventilation channels for cooling the disk, which channels are crossed by airflows according to a centrifugal direction during the rotary motion of the disk itself.

Said braking band is intended to cooperate with disk brake calipers adapted to apply a braking action on the vehicle by applying, by means of the aforesaid pads, friction on opposite surfaces of the two plates, named braking surfaces.

The controlled interaction between the opposing brake pads and the opposite braking surfaces of the braking band determines a braking action by friction which allows the deceleration or stopping of the vehicle.

Generally, the brake disk is made of gray cast iron or steel. Indeed, this material makes it possible to obtain good braking performance (especially in terms of wear containment) at a relatively low cost. Disks made of carbon or carbo-ceramic materials offer much greater performance, but at a much higher cost.

The limits of traditional disks, made of cast iron or steel, are related to excessive wear. As regards disks made of gray cast iron, another very negative aspect is related to excessive surface oxidation, with consequent formation of rust. This aspect impacts both the performance of the brake disk and its appearance because the rust on the brake disk is aesthetically unacceptable for users. Attempts have been made to tackle such problems by providing the disks made of gray cast iron or steel with a protective coating. The protective coating, on the one hand, reduces disk wear, and on the other, protects the gray cast iron base from surface oxidation, thereby preventing the formation of a layer of rust.

The protective coatings currently available and applied on gray cast iron or steel disks, while offering wear resistance, are however subject to flaking which determine their detachment from the disk itself.

A protective coating of this type is described, for example, in patent U.S. Pat. No. 4,715,486, related to a low-wear disk brake. The disk, made in particular of cast iron, has a coating made of a particle material deposited on the disk by a high kinetic energy impacting technique. According to a first embodiment, the coating contains from 20% to 30% of tungsten carbide, 5% of nickel, and the remaining part of a mixture of chromium carbides and tungsten. According to a second embodiment, the coating contains from 80% to 90% of tungsten carbide, up to 10% cobalt, up to 5% of chromium, and up to 5% of carbon.

In the case of application of the coating by thermal spray techniques, one of the causes of the detachment of the conventional protective coatings from disks made of gray cast iron or steel is the presence of free carbon in the protective coating. Indeed, the carbon tends to burn, combining with the oxygen incorporated in the protective coating being formed. This leads to the formation of microbubbles inside the coating, which can prevent an adequate adhesion of the coating onto the disk, thereby facilitating its removal.

From the above, it is apparent that the disks made of gray cast iron or steel provided with protective coatings cannot be currently used in the field of braking systems.

However, considering the advantages in terms of resistance to wear, guaranteed by the protective coatings, the need is strongly felt in the field to solve the drawbacks mentioned above with reference to the prior art. In particular, the need is felt to have gray cast iron or steel disks provided with protective coatings which can increase the wear resistance of the disk and which are also strong over time.

A solution to the aforesaid problems was suggested by the Applicant in international application WO2014/097187 for disks made of gray cast iron or steel.

In the case of disks made of gray cast iron or steel, it consists in making a protective coating on the braking surfaces of a disk brake obtained by depositing material in particle form consisting of from 70 to 95% by weight of tungsten carbide, from 5% to 15% by weight of cobalt and from 1% to 10% by weight of chromium. The deposition of the material in particle form is obtained by means of HVOF (High-Velocity Oxygen Fuel) or HVAF (High-Velocity Air Fuel) or KM (Kinetic Metallization) techniques.

More in detail, according to the solution offered in WO2014/097187, the combination of the HVOF, HVAF, or KM deposition techniques and of the chemical components used for forming the coating makes it possible to obtain a protective coating with high bond strength, which ensures a high degree of anchoring on gray cast iron or steel. The particle material used does not contain free carbon (C), not even in trace form. This makes it possible to significantly reduce the protective coating flaking phenomena.

The adoption of the solution offered in WO2014/097187 for disks made of gray cast iron or steel or in WO2014/097186 for disks made of aluminum aluminum or alloy makes it possible to significantly reduce the protective coating flaking phenomena found in the known prior art, but not to eliminate them completely. Indeed, even in disks made of aluminum or aluminum alloy or gray cast iron or steel provided with a protective coating made according to WO2014/097186 or WO2014/097187, flaking and subsidence of the protective coating continue to occur, albeit at a lesser frequency than in the known prior art.

A partial solution to the problem of flaking and subsidence of the protective coating has been offered by the Applicant in international application WO2017046681A1. In particular, such a solution includes making a base protective coating consisting of from 65% to 95% of chromium carbide (Cr3C2) and for the rest of nickel-chromium (NiCr) between the protective coating and the braking surfaces. The surface protective coating, made over the base protective coating consists of 80 to 90% by weight of tungsten carbide (WC) and the rest by cobalt (Co). The deposition of the material in particle form for both protective coatings is obtained by means of HVOF (High-Velocity Oxygen Fuel) or HVAF (High-Velocity Air Fuel) or KM (Kinetic Metallization) techniques. Such a solution is applied in particular to disks made of gray cast iron or steel.

relative to the prior art, the technical solution offered by WO2017046681A1 offers significant improvements in terms of reduction of failure and flaking of protective coatings. However, the results which can be achieved are not entirely satisfactory.

So, the need for disks made of gray cast iron, steel aluminum or aluminum alloy provided with protective coatings which are not subject to flaking or which are subject to it to a much lesser degree than the known solutions continues to exist in the reference field, to ensure wear resistance over time.

Document DE102008022225 is one of the first examples of "activation" of a surface intended to receive a protective layer, where activation means the processing of a surface capable of creating a shape adapted to for a geometric coupling with the protective layer.

This solution discloses a method of making cavities in a body by machining, wherein the base of the cavities is connected with a body surface by a side obtained by removing a portion of the body material bounding the cavities by radiating with a laser inclined at an angle of 5 to 60 [degrees] and 115 to 175 [degrees] with respect to a tangential plane lying on the body surface, forming semi-open cavities with sides which form undercuts. The cavities are covered by applying a coating or protective layer.

The cavities are formed as grooves, which extend in a preferred direction to cover the entire area of interest. The treated surface is the inner surface of a cylinder, or a cylinder liner, for a reciprocating piston engine, which has a cylindrical geometry and is rotationally symmetrical about a longitudinal axis. The cavities run along an inner circumference of the cylinder bore or cylinder liner and extend spirally or vertically relative to the longitudinal axis of the cylinder liner. The undercuts form an opening angle of 0-45 [degrees] and/or 180-135 [degrees] with respect to the longitudinal axis of the cylinder liner.

This solution is very complex to implement due to the shape of the cavities themselves.

A similar solution applied to a brake disk is known from U.S. Pat. No. 2,255,024, US2016178019 and US2005221057A1.

Document DE102010052735 shows a brake disk comprising a braking band having an annular friction surface coated with a thermal spray coating, wherein a plurality of grooves or cavities extend over the annular friction surface forming an undercut on both vertical or side walls of each groove, to provide an engagement coupling for the thermal spray coating. The grooves or slots extend along the surface in spiral shapes covering the entire extent of the friction surface.

This solution further improves the grip between the protective coatings and the body of the braking band by further reducing flaking.

However, the presence of undercuts obligates the use of complex turning operations with multiple cutting edge tools which must necessarily enter the surface immediately for the entire height of the slot, thus obliging machining in a single tool pass, and necessarily starting from the outer edge of the braking band; indeed, the inner edge is usually difficult to access due to the presence of the bell or the connection means to the bell.

For the same reason, i.e. the presence of undercuts in the sides of the grooves or slots, the tool is obliged to follow a spiral path and, if it cannot exit from the inner edge of the braking band, it is obliged to travel a reverse path to retrace the entire path of cut and exit from the outer edge of the braking band. This imposes the use of tools provided with multiple cutting edges adapted to work both in one direction of the spiral cutting path, and in the opposite direction to extract the tool, without which if the tool were to find even the slightest imperfection, even an excessive roughness of the walls of the groove or slot, it could tear the material of the braking band or split, making the braking band unacceptable in production and interrupting normal production with increased costs and labor.

Therefore, there remains a strong need for a groove or slot geometry which solves the aforesaid drawbacks.

Solution

It is the object of the present invention to provide a braking band in which protective coatings are not subject to flaking or are subject to flaking to a lesser extent than currently known solutions, to ensure wear resistance over time.

This and other purposes and advantages are achieved by a braking band, a disk brake disk, a vehicle, a method for producing the braking band and a tool as described and claimed herein.

Some advantageous s are the object of the dependent claims.

From the analysis of this solution, it has emerged how the suggested solutions make it possible to obtain an improved grip or engagement between the protective coatings and the body of the braking band, further reducing flaking.

Furthermore, the suggested solution is suited for machining rough profiles defined by a plurality of projections and grooves or slots which can be made by machining by chip removal or by laser engraving or by plastic deformation with a path not necessarily spiral, but also annular, which is closed and in particular closed on itself or not closed on itself but not ending on an edge of the braking band.

In particular, the suggested solutions also lend themselves to machining in multiple passes and in the case of tools with multiple cutting edges do not oblige to retrace the path of cuts or to exit the machining performed, avoiding deterioration of the finish of the machining or ruining the cutting edges of the tool, avoiding or limiting the discarding of part of the production and interruptions of normal production, avoiding the aggravation of costs and labor.

FIGURE

Further features and advantages of the device, of the brake disk and of the vehicle will be apparent from the following description of preferred embodiments thereof, by way of non-limiting examples, with reference to the accompanying figures, in which.

DESCRIPTION OF SOME PREFERRED EMBODIMENTS

Figure 1:
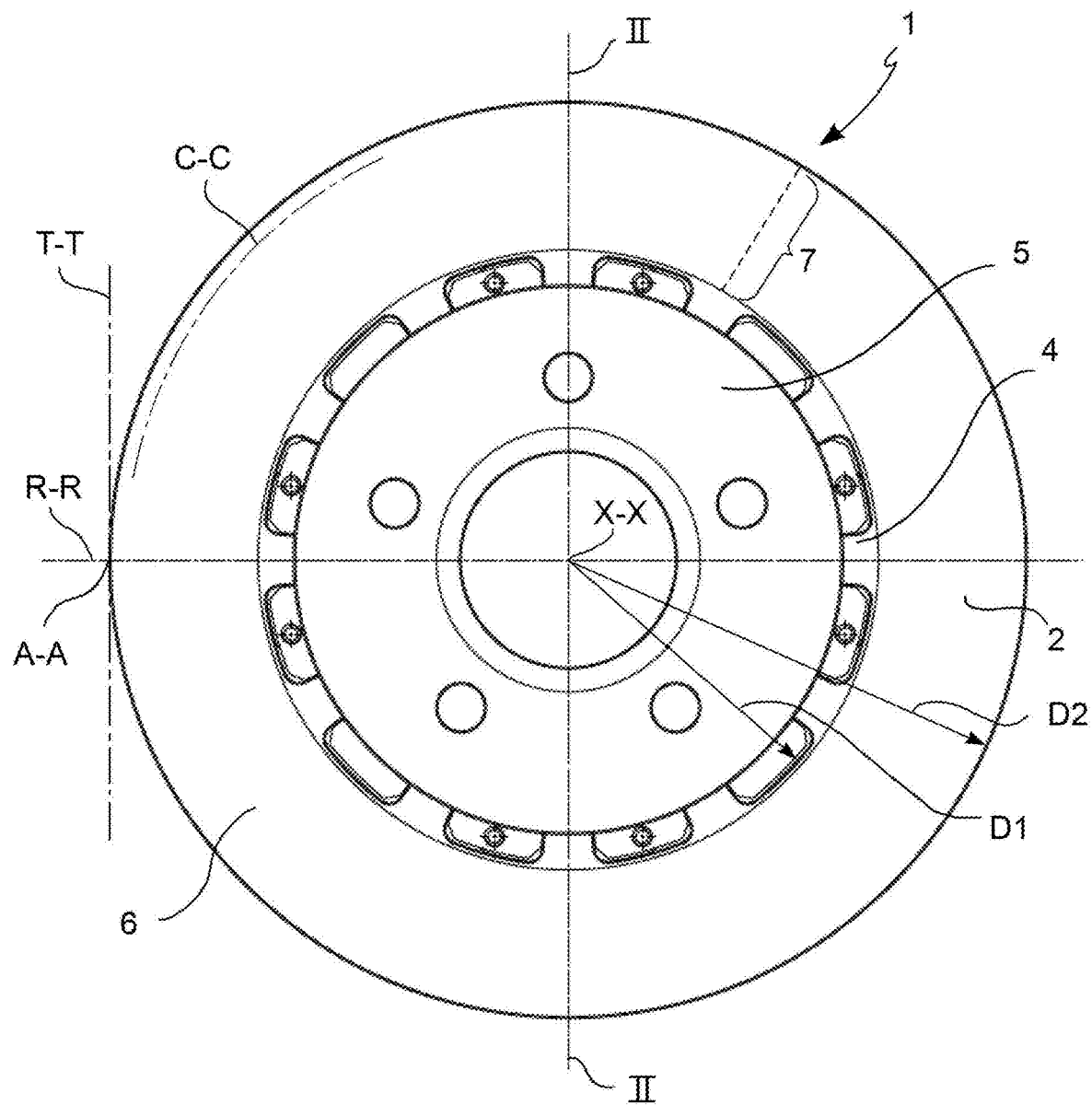
FIG. 1 is a plan or top view of a disk brake.

Elements or parts in common to the embodiments described will be indicated hereafter using the same reference numerals.

With reference to the aforesaid figures, reference numeral 1 indicates a brake disk as a whole according to the present invention.

According to a general embodiment of the invention, shown in the accompanying figures, the disk brake 1 comprises a braking band 2, provided with two opposed braking surfaces 2a and 2b, each of which at least partially defines one of the two main faces of the disk.

The braking band 2 consists of a base metal chosen from gray cast iron or steel. Preferably, the braking band is made of gray cast iron. In particular, the entire disk is made of gray cast iron. Therefore, in the following description, reference will be made to a disk made of gray cast iron, without however excluding the possibility that it is made of steel.

The disk 1 is provided with:
a base protective coating 30 which covers at least one of the two braking surfaces of the braking band; and
a surface protective coating 3 which covers at least one of the two braking surfaces of the braking band and is made to cover the aforesaid base protective coating 30.

The base protective coating 30 is constituted of chromium carbide ($Cr_3C_2$) and nickel-chromium (NiCr), or of nickel-chromium (NiCr), iron (Fe), molybdenum (Mo), cobalt (Co), manganese (Mn), and aluminum (Al), and is obtained by a spray deposition technique on the disk 1, preferably HVOF (High-Velocity Oxygen Fuel) technique, or HVAF (High-Velocity Air Fuel) technique or KM (Kinetic Metallization) technique of the components of the coating in particle form.

The surface protective coating 3 consists of tungsten carbide (WC), iron (Fe), chromium (Cr), and aluminum (Al) and is obtained by depositing tungsten carbide (WC), iron (Fe), chromium (Cr), and aluminum (Al) in particle form on the base protective coating 30 by means of spraying technique, preferably with HVOF (High-Velocity Oxygen Fuel) technique or by HVAF (High-Velocity Air Fuel) technique or by KM (Kinetic Metallization) technique.

Figure 2:
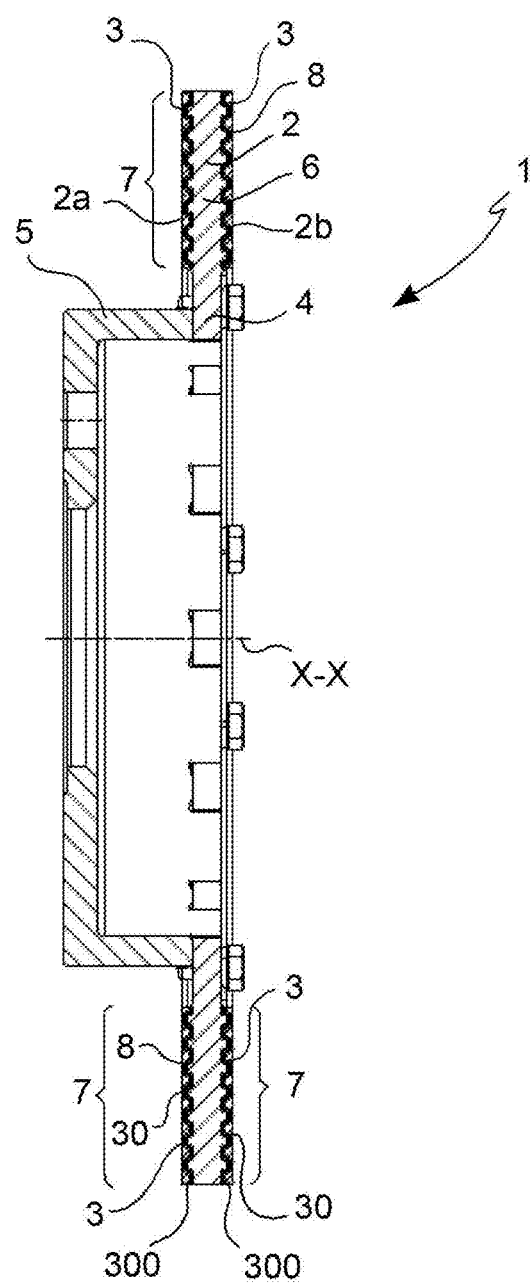
FIG. 2 shows a section view of the disk in FIG. 1 taken along the section line II-II indicated thereon, in which the braking band is diagrammatically shown, without respecting the real proportions of the coating layers and the roughness profile, to make their features graphically appreciable.
Figure 3:
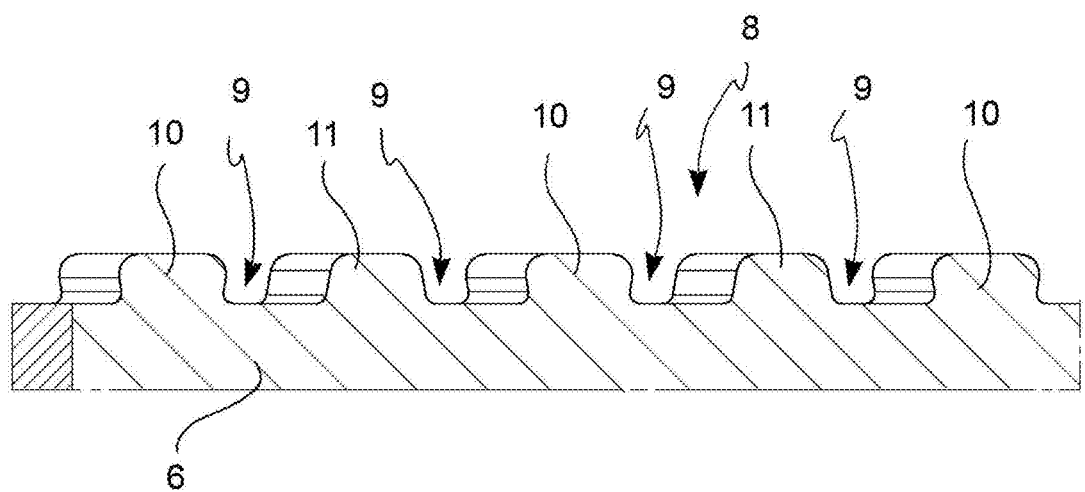
FIG. 3 shows an axonometric section view of a detail of the braking surface of the disk of FIG. 1, in which the protective layer is not shown to better appreciate the geometry of the rough profile.
Figure 4:
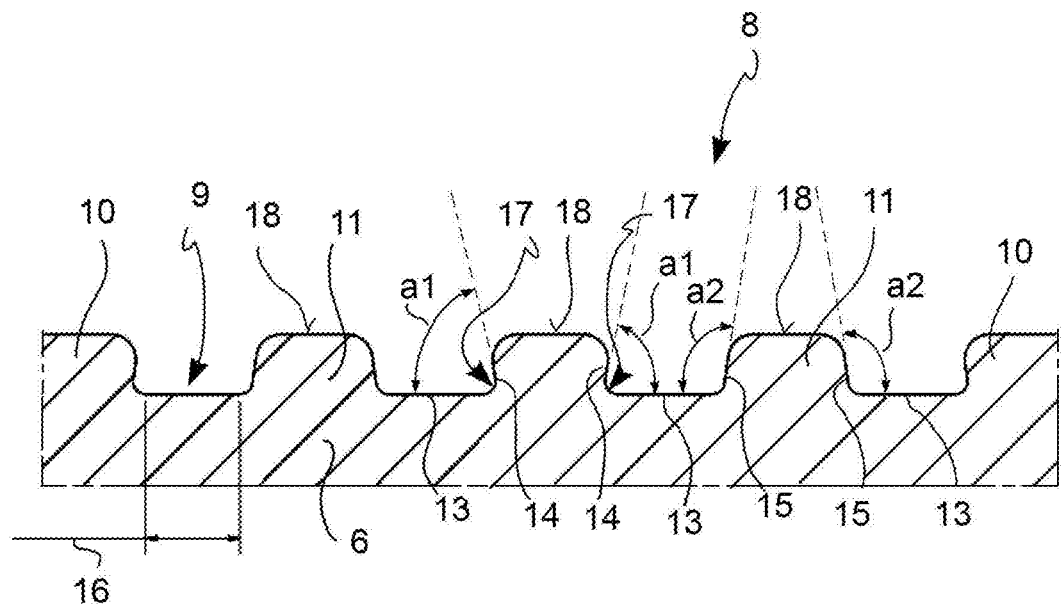
FIG. 4 shows a section view of a detail with the profile of the layer with a rough profile shown in FIG. 3.
Figure 5:
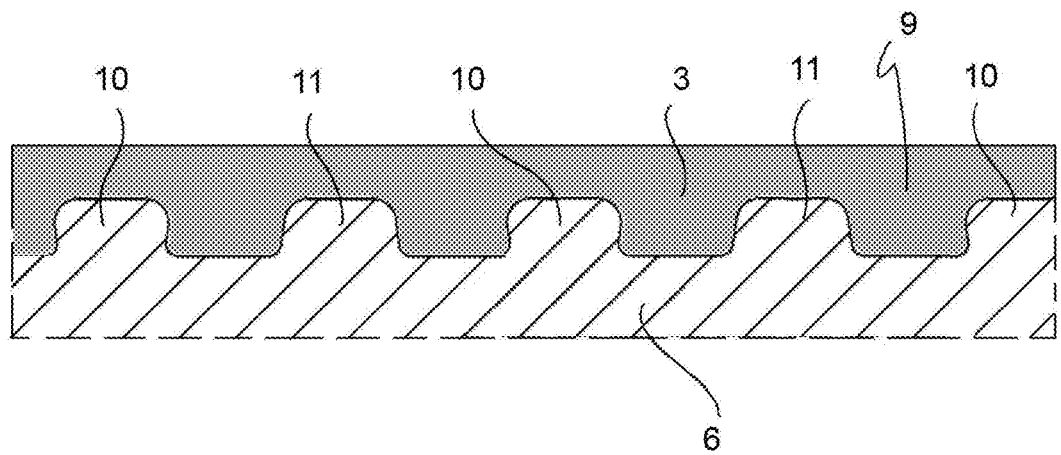
FIG. 5 is a section view of a detail of a braking band in which there is shown the layer with a rough profile and a protective coating.

According to the invention, as diagrammatically shown in FIGS. 2 and 3, the braking surface coated by the aforesaid base protective coating 3 is defined by a nitrocarburized layer 300 of the base metal (gray cast iron or steel) and has a rough profile in radial or circumferential cross-section relative to the center of the braking band.

The protective base layer 30 is therefore fixed not directly onto the base metal which forms the braking band but is fixed on the aforementioned nitrocarburized base metal layer 300.

In particular, the rough profile is defined by a plurality of projections 20 which extend orthogonally to the surface with a height between 30 and 200 μm and are mutually spaced apart—in radial direction or circumferential direction relative to the center of the braking band—with a pitch between 300 and 2000 μm. Preferably, the projections are distributed in a regular pattern over the braking surface of disk 1. However, an irregular distribution pattern may also be provided.

Advantageously, as diagrammatically shown in FIG. 6, the aforementioned projections 20 have a profile which will be described in greater detail below.

According to an alternative embodiment, the aforesaid rough profile may have a roughness Ra between 0.8 and 2, if obtained by turning, or a roughness Rz between 10 and 80, if obtained by sandblasting.

Preferably, the aforesaid nitrocarburized layer 300 is obtained by a ferritic nitrocarburization treatment of the base metal.

According to a preferred embodiment, the nitrocarburized layer 300 has a depth comprised between 2 and 30 μm and hardness values higher than 300 HV in microhardness.

According to a particularly preferred embodiment, the aforesaid nitrocarburized layer 300 comprises an oxidized top layer 330 comprising magnetite $Fe_3O_4$ which acts as an interface with the aforesaid protective base layer 30.

Preferably, the aforementioned oxidized top layer 330 comprising magnetite $Fe_3O_4$ has a thickness comprised between 2 and 10 μm.

Preferably, the base protective coating 30 is constituted by:
65% to 95% of chromium carbide ($Cr_3C_2$) and the remainder of nickel-chromium (NiCr); or
nickel-chromium (NiCr) with content by weight of nickel (Ni) from 40% to 75% and a content by weight of chromium (Cr) from 14% to 30%, and the remainder of iron (Fe), molybdenum (Mo), cobalt (Co), manganese (Mn) and aluminum (Al).

In particular, the base protective coating 30 may have the following compositions:
93% by weight of chromium carbide ($Cr_3C_2$) and 7% of nickel-chromium (NiCr);
90% by weight of chromium carbide ($Cr_3C_2$) and 10% of nickel-chromium (NiCr);
75% by weight of chromium carbide ($Cr_3C_2$) and 25% of nickel-chromium (NiCr); or
65% by weight of chromium carbide ($Cr_3C_2$) and 35% of nickel-chromium (NiCr).

Preferably, the base protective coating 30 consists of from 75% by weight of chromium carbide (Cr3C2) and of 25% of nickel-chromium (NiCr). In particular, the nickel-chromium (NiCr) consists of from 80% of nickel and of 20% chromium.

Preferably, the surface protective coating 3 consists of from 75% to 87% by weight of tungsten carbide (WC) and iron (Fe), chromium (Cr), and aluminum (Al) for the rest. Even more preferably, the surface protective coating 3 consists of 85% by weight of tungsten carbide (WC) and 15% by weight of iron (Fe), chromium (Cr), and aluminum (Al).

Advantageously, the thickness of the base protective coating 20 is comprised between 20 μm and 80 μm, and preferably equal to 50 μm, while the thickness of the surface protective coating 3 is comprised between 30 μm and 90 μm, and preferably equal to 60 μm. The thickness of the two protective coatings 3 and 30 is calculated relative to the portions of the coating above the rough state. These are therefore minimum thickness values which do not take into account the thickness of the coating which may be used to fill the dips/pits of the roughness.

Figure 6:
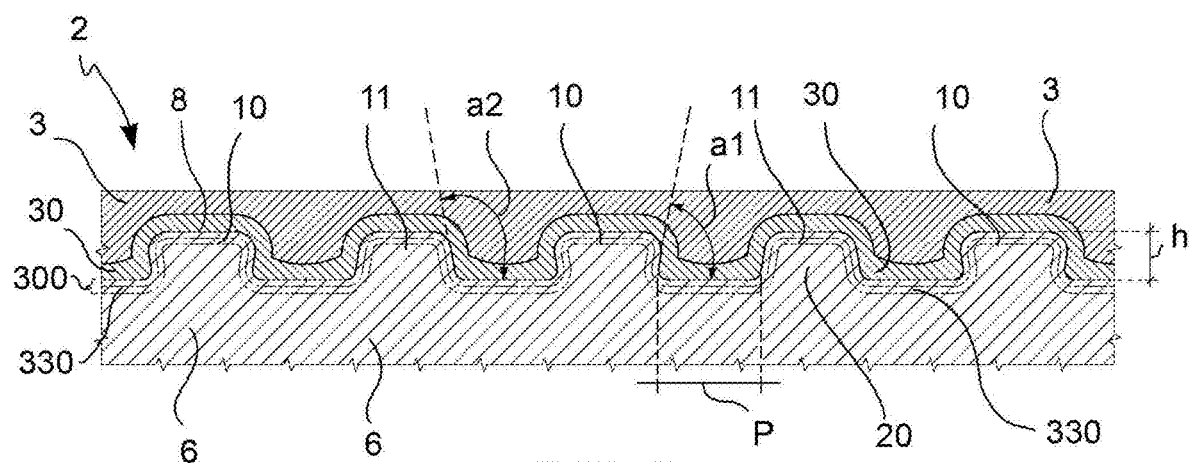
FIG. 6 shows an enlarged section view of a detail in FIG. 2, relating to a portion of the braking band indicated in the box thereon.
Figure 7:
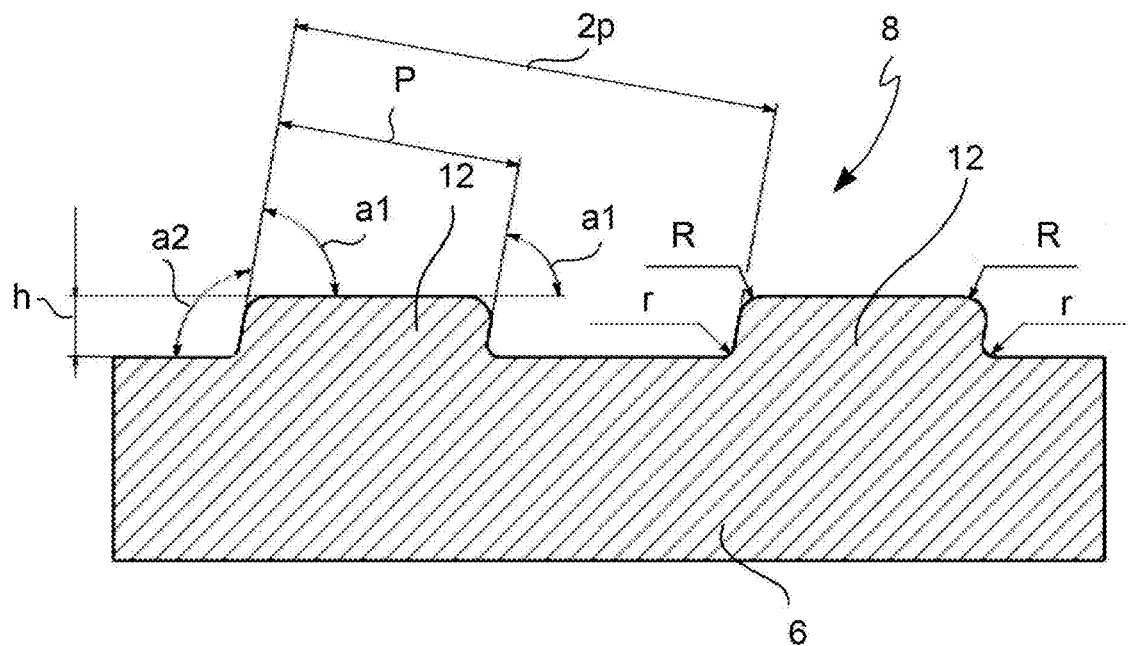
FIG. 7 shows a section view of a detail of a braking band having a layer with a rough profile according to a further embodiment.
Figure 8:
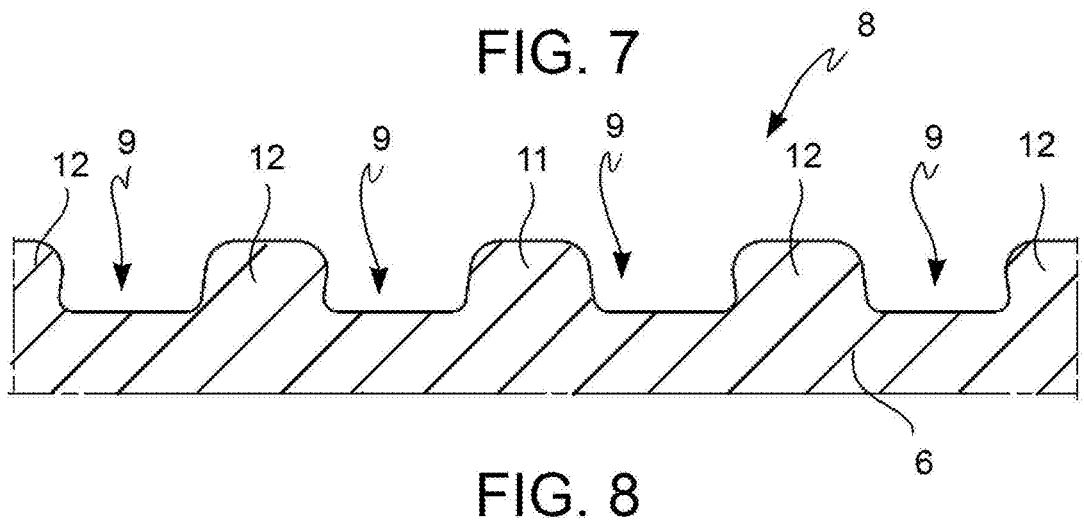
FIG. 8 shows a section view of a detail of a braking band having a layer with a rough profile according to a yet further embodiment.
Figure 9:
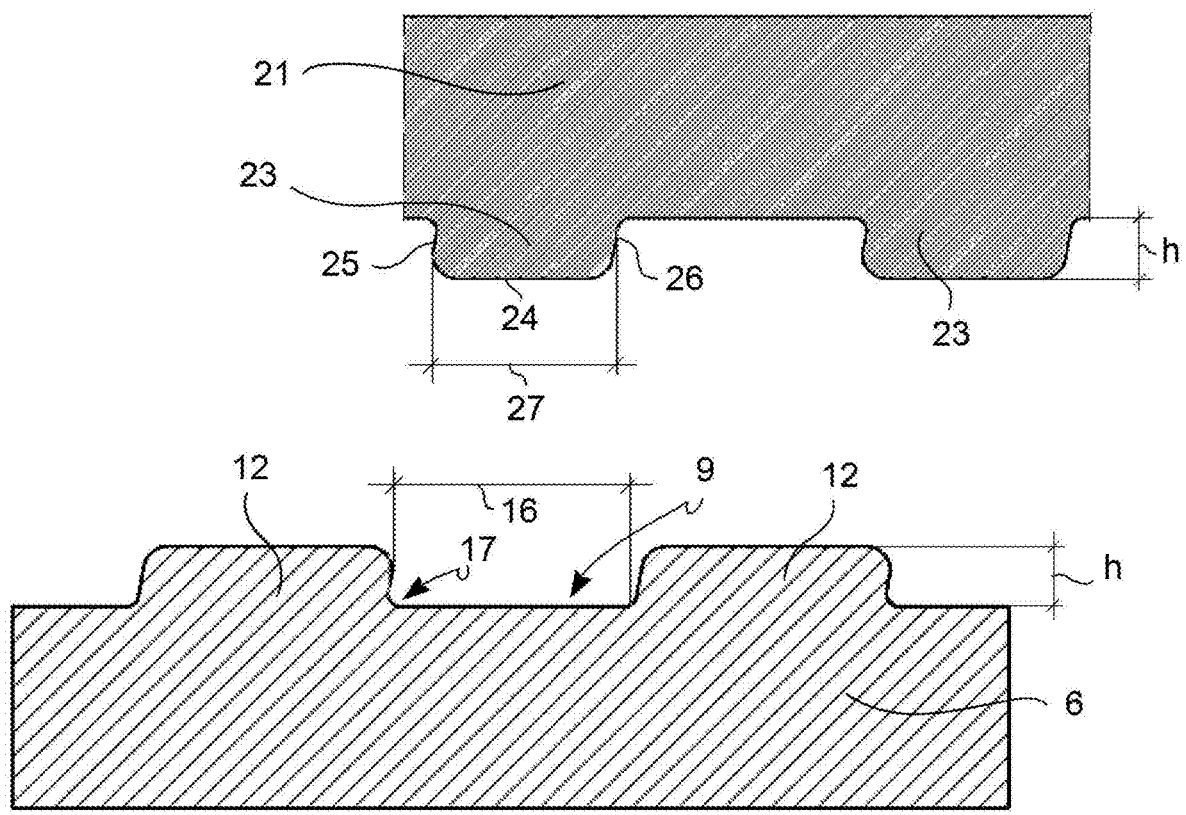
FIG. 9 shows a section view of a detail of a braking band during a step of machining by chip removal in which a detail of a tool facing the machined surface is shown.

As a whole, as diagrammatically shown in FIG. 6, the two protective coatings 3 and 30 completely fill the roughness of the braking surface and develop over the rough profile with layers of thickness preferably within the intervals specified above.

It has been surprisingly found that the presence of the aforesaid nitrocarburized layer 300 at the interface between the unmodified base metal and the protective base coating 30 allows a significant reduction, if not a complete cancellation, of the occurrence of coating flaking phenomena, relative to brake disks with similar protective coatings but without a nitrocarburized layer.

A possible technical explanation, which is in all cases non-limiting, is based on the fact that, unlike traditional protective coatings, the nitrocarburized layer protects the base metal from corrosion without, however, being made up of a layer of material applied onto the base metal itself. In other words, there is no net separation area between the unmodified base metal and the nitrocarburized layer 300. The nitrocarburized layer is indeed a layer of the base metal morphologically and chemically modified by a process of nitrocarburization. The transition from unmodified base metal to nitrocarburized metal may therefore be progressive.

From this point of view, the roughness profile of the braking surface, where the nitrocarburized layer 300 is made, further accentuates the irregularity in the transition from nitrocarburized to the unmodified base metal, thereby boosting the positive effects.

The roughness profile of the braking surface, where the nitrocarburized layer 300 is made, further facilitates the mechanical adhesion of the base protective layer 30 to the nitrocarburized layer.

It has also been experimentally verified that the presence of the nitrocarburized layer 300 does not affect the performance of the protective surface coating 3 in terms of both wear resistance and tribological behavior (friction, fading, running-in) under normal environmental conditions.

Finally, it has been experimentally verified that the presence of the nitrocarburized layer 300 improves resistance in presence of environmental stresses (thermal shocks and salt attacks).

The anti-corrosion action offered by the nitrocarburized layer is accentuated in the preferred case in which the nitrocarburized layer 300 comprises an oxidized top layer 330 comprising magnetite Fe3O4.

Such an anti-corrosion action is in any case further enhanced by the presence of the base coating layer 30. By virtue of the composition of such a protective base coating 30 (Cr3C2 and NiCr, or NiCr, Fe, Mo, Co, Mn, and Al) and the deposition method, such a base coating 30 also has an anti-corrosive effect on the braking surface of the disk.

The anti-corrosive action goes to the benefit of the integrity and the adhesion of the surface protective coating 3 to the disk.

The base protective coating 30 also performs a mechanical "damper" function for the surface protective (anti-wear) coating 3. Indeed, the base protective coating 30 formed by Cr3C2 and NiCr or by NiCr, Fe, Mo, Co, Mn, and Al has a higher degree of ductility than the surface protective coating 3 formed by tungsten carbide, iron, chromium, and aluminum. This confers an elastic behavior to the base layer 30 which helps mitigate—at least in part-the stresses imparted to the disk when in use. Therefore, the base protective coating 30 acts as a sort of damper or cushion between the disk and the surface protective coating 3. This prevents direct transmission of stresses between the two parts, thereby reducing the risk of triggering cracks in the surface protective coating 3.

As regards the anti-wear function, the surface protective coating 3 is biased neither by the presence of the base protective coating 30 nor by the nitrocarburized layer 300 (possibly with oxidized top layer 330).

For the sake of simplicity, the brake disk 1 will now be described together with the method according to the present invention.

The brake disk 1 is made preferably, but not necessarily, with the method according to the invention described below.

According to a general implementation of the method according to the invention, the method comprises the following operating steps:

step a) preparing a brake disk, comprising a braking band 2 provided with two opposite braking surfaces 2a, 2b, each of which defines at least partially one of the two main faces of the disk, the braking band being made of gray cast iron or steel;

step b) subjecting at least one of said braking surfaces (2a or 2b) to a working process designed to increase their surface roughness;

step c): nitrocarburizing the braking surface with increased surface roughness obtaining on such a surface a nitrocarburized surface layer 300;

step d:) depositing on the nitrocarburized surface layer 300 a material in particle form consisting of:
chromium carbide (Cr3C2) and nickel-chromium (NiCr), or
nickel-chromium (NiCr), iron (Fe), molybdenum (Mo), cobalt (Co), manganese (Mn) and aluminum (Al),
with a spray deposition technique, preferably HVOF (High-Velocity Oxygen Fuel) technique or HVAF (High-Velocity Air Fuel) technique or KM (Kinetic Metallization) technique, forming a base protective coating 30 which covers at least one of the two braking surfaces of the braking band with the interposition of said nitrocarburized layer 300; and step e): depositing over the base protective coating (30) a material in particle form consisting of tungsten carbide (WC), iron (Fe), chromium (Cr), and aluminum (Al), with a spray deposition technique, preferably HVOF (High-Velocity Oxygen Fuel) technique, or HVAF (High-Velocity Air Fuel) technique or KM (Kinetic Metallization) technique, forming a surface protective coating 3 which consists of tungsten carbide (WC) and iron (Fe), chromium (Cr) and aluminum (Al) and which covers at least one of the two braking surfaces of the braking band.

In particular, the processing performed in step b) may be performed to generate on the surface a rough profile defined by a plurality of projections 20 which extend orthogonally to the surface with a height h between 30 and 200 µm and are mutually spaced apart—in radial direction or circumferential direction relative to the center of the braking band—with a pitch P between 300 and 2000 µm.

Advantageously, such projections 20 have a profile which will be described in greater detail below. The presence of this profile increases the mechanical adhesion capacity of the basic protective coating 30 on the nitrocarburized layer 300.

In particular, the aforesaid step b) is carried out with the working process by chip removal or by laser incision or by plastic deformation.

Advantageously, the aforesaid step b) may alternatively be carried out with a working process by fine turning with roughness Ra between 0.8 and 2.

According to a further alternative, the aforesaid step b) is carried out with the working process by sandblasting with roughness Rz between 10 and 80.

Preferably, the step (c) of nitrocarburization is obtained by a ferritic nitrocarburization treatment.

Advantageously, the nitrocarburization step c) is carried out so that the nitrocarburized surface layer 300 has a depth between 2 and 30 µm and hardness values higher than 300 HV in microhardness.

According to a preferred embodiment of the method according to the invention, step c) of nitrocarburizing is followed by step f) of post-oxidation of the nitrocarburized layer 300, performed before step d) of deposition, to obtain an oxidized top layer 330 comprising magnetite Fe3O4.

Preferably, the oxidized top layer 330 comprising magnetite (Fe3O4) has a thickness comprised between 2 and 10 µm.

The presence of the oxidized top layer 330 comprising magnetite (Fe3O4) enhances the anti-corrosive action of the nitrocarburized layer on the unmodified base metal.

Nitrocarburization is a process well known in itself to a person skilled in the art and will therefore not be described in detail. Here we limit ourselves to providing some general information for clarification.

Nitrocarburization is a thermochemical surface hardening process conducted in ferritic phase at relatively low temperatures (550° C.-580° C.) and under such conditions as to obtain a diffusion of nitrogen and carbon in the surface area of the piece. In particular, the means adopted in implementing the process of diffusion of nitrogen and carbon are: salt baths; gas; plasma.

Nitrocarburization with a gaseous medium is preferred over nitrocarburization in a salt bath when a high degree of uniformity and cleanliness is sought (blind cavities, grooves, threads, etc.).

The temperatures adopted in the nitrocarburization process guarantee the containment of deformations.

As an alternative to ferritic nitrocarburization, an ion nitrocarburization can be implemented. The latter differs from the ferritic one essentially for the temperature which is 570° C. and the atmosphere which is made up of ammonia and methane.

With the ion nitrocarburization process, it is possible to vary the type of surface constituent as well as the depth at will. The formation of layers (Fe4N) or (Fe2-3CxNy) can then be determined in the case of components (such as brake disks) which must withstand fatigue and/or wear.

Preferably, the material in particle form deposited in the step d) of depositing for making the base protective coating 30 consists of from 65% to 95% of chromium carbide (Cr3C2) and nickel-chromium (NiCr) for the rest.

In particular, the material in particle form deposited in step b) of depositing for making the base protective coating 30 may have the following compositions:
  93% by weight of chromium carbide (Cr3C2) and 7% of nickel-chromium (NiCr);
  90% by weight of chromium carbide (Cr3C2) and 10% of nickel-chromium (NiCr);
  75% by weight of chromium carbide (Cr3C2) and 25% of nickel-chromium (NiCr); or
  65% by weight of chromium carbide (Cr3C2) and 35% of nickel-chromium (NiCr).

According to a preferred embodiment, the material in particle form deposited in the step d) of depositing for making the base protective coating 30 consists of 75% by weight of chromium carbide (Cr3C2) and 25% of nickel-chromium (NiCr). In particular, the nickel-chromium (NiCr) consists of from 80% of nickel and of 20% chromium.

Alternatively, the material in particle form deposited in the deposition step d) to make the base protective coating 30 is based on nickel-chromium (NiCr) with a content by weight of nickel (Ni) from 40% to 75% and with a content by weight of chromium (Cr) from 14% to 30%, and for the remainder of iron (Fe), molybdenum (Mo), cobalt (Co), manganese (Mn) and aluminum (Al).

Preferably, the material in particle form deposited in the step e) of depositing for making the surface protective coating 3 consists of from 75% to 87% by weight of tungsten carbide (WC) and iron (Fe), chromium (Cr), and aluminum (Al) for the rest.

In particular, the material in particle form deposited in the step e) of depositing for making the surface protective coating 3 consists of from 10% to 17% by weight of iron (Fe), from 2.5% to 5.8% by weight of chromium (Cr), from 0.6% to 2.2% by weight of aluminum (Al) and the rest by tungsten carbide (WC).

According to a preferred embodiment, the surface protective coating 3 which is obtained consists of 85% by weight of tungsten carbide (WC) and 15% by weight of iron (Fe), chromium (Cr), and aluminum (Al).

Advantageously, the brake disk is provided with a portion adapted to fix the disk to a vehicle, constituted by an annular portion or fixing portion 4 which is arranged centrally relative to the disk 1 and concentric to the braking band 2. The fixing portion 4 supports the connection element 5 to the wheel hub (i.e. the bell). The bell may be formed in one piece with the annular fixing portion (as shown in the accompanying figures) or may be formed separately and then fixed by means of appropriate connecting elements to the fixing portion.

The annular fixing portion 4 can be made of the same material as the braking band, i.e. of gray cast iron, or steel. The bell 5 can also be made of aluminum or gray cast iron or other appropriate material. In particular, the entire disk (i.e. the braking band, fixing portion, and bell) can be made of gray cast iron.

Preferably, the braking band 2 is made by casting. Similarly, when they are made of gray cast iron, the fixing portion and/or the bell may be produced by casting.

The annular fixing portion can be made in a single body with the braking band (as shown in the accompanying figures) or can be made as a separate body, mechanically connected to the braking band.

Advantageously, the material in particle form which is deposited in step d) for forming the base protective coating 30 has a particle size comprised between 5 and 40 µm. The choice of such a range of values makes it possible to confer high properties of deposition surface density and adhesion capacity to the nitrocarburized layer 300.

Preferably, the thickness of the base protective coating 30 is comprised between 20 µm and 80 µm, and preferably equal to 50 µm. The choice of such a range of values makes it possible to achieve an optimum balance between the effectiveness of the anti-oxidizing protective action and limitation of the thermal expansions on the coating itself. In other words, if the thickness of the base protective coating 30 were less than 20 µm, there would not be a sufficient anti-oxidizing protective action. A thickness greater than 80 µm, on the other hand, could lead in time to an imperfect adhesion due to thermal expansions which occur during the life cycle of a disk brake.

Within the aforesaid range of thicknesses, the base protective coating 30 can perform the aforementioned "damper" effect which helps preserve the integrity of the surface protective coating 3.

Advantageously, the material in particle form which is deposited in step e) for forming the surface protective coating 3 has a particle size comprised between 5 and 45 µm. The choice of such a range of values makes it possible to confer high properties of density, hardness and limited porosity to the coating.

Preferably, the thickness of the surface protective coating 3 is comprised between 30 µm and 90 µm, and preferably equal to 60 µm. The choice of such a range of values makes it possible to achieve an optimum balance between the consumption of the protective layer and the limitation of the thermal expansions on the coating itself. In other words, if the thickness of the protective coating were less than 20 µm, in case of wear, it would be totally removed in an excessively short time. A thickness greater than 90 µm, on the other hand, could lead in time to an imperfect adhesion due to thermal expansions which occur during the life cycle of a disk brake.

As mentioned above, the thickness of the two protective coatings 3 and 30 is calculated in relation to the portions of the coating above the rough state. These are therefore minimum thickness values which do not take into account the thickness of the coating which may be used to fill the dips/pits of the roughness.

As a whole, as diagrammatically shown in FIG. 6, the two protective coatings 3 and 30 completely fill the roughness of the braking surface and develop over the rough profile with layers of thickness preferably within the intervals specified above.

As already mentioned, both the material which forms the base protective coating 30 (chromium carbide (Cr3C2) and nickel-chromium (NiCr), or nickel-chromium (NiCr), iron (Fe), molybdenum (Mo), cobalt (Co), manganese (Mn) and aluminum (Al)), and the material forming the surface protective coating 3 (tungsten carbide, iron, chromium, and aluminum) are deposited in particle form on the nitrocarburized layer 300 and on the base protective coating 30, preferably by HVOF technique or by HVAF technique or by KM technique, respectively.

These three deposition techniques are well known to a person skilled in the art and will therefore not be described in detail.

HVOF (High-Velocity Oxygen Fuel) is a powder spray deposition technique which uses a spray device provided with a mixing and combustion chamber and with a spray nozzle. Oxygen and fuel are fed to the chamber. The hot combustion gas which forms at pressures close to 1 MPA crosses the convergent-divergent nozzle conveys the material in powder to hypersonic speed (i.e. higher than MACH 5). The material in powder to be deposited is injected into the hot gas flow, in which it melts rapidly and is accelerated to a speed of the order of 1000 m/s. Once it has impacted onto the deposition surface, the molten material cools rapidly and a very dense and compact structure is formed by virtue of the high kinetic energy impact.

The HVAF (High-Velocity Air Fuel) deposition technique is similar to the HVOF technique. The difference is that air instead of oxygen is supplied into the combustion chamber in the HVAF technique. Therefore, the temperatures in hand are lower than those of the HVOF technique. This allows better control of the thermal alteration of the coating.

The KM (Kinetic Metallization) deposition technique is a solid-state deposition process in which metal powders are sprayed through a sonic deposition nozzle in two steps which accelerate and triboelectrically charge the metal particles in an inert gas flow. Thermal energy is supplied in the carrier stream. The potential energy of the compressed inert gas flow and of the thermal energy is converted into kinetic energy of the powders in the process. Once accelerated at high speed and electrically charged, the particles are directed against the deposition surface. The high-speed collision of the metal particles with such a surface causes large deformation of the particles (approximately 80% in a direction perpendicular to the impact). This deformation results in an enormous increase in the surface area of the particles. As an effect of the impact, intimate contact is formed between the particles and the deposition surface, which leads to the formation of metallic bonds and a coating having a very dense and compact structure.

Advantageously, as an alternative to the three deposition techniques listed above, which share the fact of being high kinetic energy impact deposition techniques, there are other techniques which exploit different deposition methods, but which can generate coatings having a very dense and compact structure.

The combination of the HVOF, HVAF, or KM deposition techniques and of the chemical components used for forming the two protective coatings—base 30 and surface 3—makes it possible to obtain protective coatings with high bond strength on the lower material on which they are deposited.

In particular, the aforesaid combination allows to obtain a high anchoring degree both of the base coating 30 on the nitrocarburized layer 300 (possibly with oxidized top layer 330), and of the surface coating 3 on the protective base coating 30.

The absence of free carbon (C), preferably not present even in trace form in the final materials which constitute the two protective coatings, helps reduce the risk of detachments. Indeed, it has been found that in the case of application of the coating with thermal spray techniques, a cause of the detachment of conventional protective coatings from disks made of aluminum or aluminum alloy or of gray cast iron or steel is the presence of free carbon in the protective coating. Indeed, the carbon tends to burn, combining with the oxygen incorporated in the protective coating being formed. This leads to the formation of micro-bubbles inside the coating, which can prevent an adequate adhesion of the coating onto the disk, thereby facilitating its removal.

According to a particularly preferred embodiment of the invention, both the material in particle form deposited in the step d) of depositing for making the base protective coating 3 and the material in particle form deposited in the step e) of depositing for making the surface protective coating 30 are deposited by means of HVOF (High-Velocity Oxygen Fuel) technique. Indeed, it has been found that this technique-in particular, if associated with a braking band or with an entire disk made of gray cast iron-makes it possible to achieve a combined protective coating (base-surface) which offers the best compromise in terms of wear resistance and tribological performance.

More in detail, according to experimental tests performed relative to the (preferred) HVOF (High-Velocity Oxygen Fuel) technique, the HVAF (High-Velocity Air Fuel) technique makes it possible to obtain compact and uniform coatings with regular thickness close to nominal values. The coatings made with HVOF are less compact, have a "spongy" appearance, and variable thickness.

The thermal shock tests conducted on samples having coatings made by HVOF and HVAF showed damage which affected only the WC+Fe, Cr, Al surface protective coating, found on all specimens and which consists in a micro-cracking of the coating. Such micro-cracking however appears to be more pronounced in specimens with coatings made by HVAF technique, probably due to the greater rigidity of the application. This makes the HVOF technique more preferable.

In all cases, the base protective coating made of Cr3C2+Ni or NiCr+Fe+Mo+Co+Mn+Al did not suffer consequences following the thermal shock test, always being dense, perfectly adhered to the cast iron, and free from cracks.

As mentioned above, the base protective coating 30 and the surface protective coating 3 cover at least one of the two braking surfaces of the braking band.

The whole of the base protective coating 30 and the surface protective coating 3 will be identified globally hereinafter as "combined protective coating" 3, 30.

Preferably, as shown in FIG. 2, the disk 1 is provided with a "combined protective coating" 3, 30 which covers both braking surfaces 2a and 2b of the braking band 2.

In particular, the combined protective coating 3, 30 may cover only the braking band, on a single braking surface, or both.

According to solutions of embodiments not shown in the accompanying figures, the combined protective coating 3, 30 may extend also to other parts of the disk 1 as the annular fixing portion 4 and the bell 5, to cover the entire surface of the disk 1. In particular, the combined protective coating 3, 30 may cover-in addition to the braking band-only the fixing portion or only the bell. The choice is substantially dictated by reasons of appearance, to have a uniform coloring and/or finishing on the entire disk or between some portions of it.

Advantageously, the particle material depositing for the formation of the combined protective coating 3, 30 may be performed in a differentiated manner on the surface of the disk at least in terms of the coating thickness.

At the braking band, the combined protective coating 3, 30 can be made with the same thickness in the two opposite braking surfaces. Alternative solutions can be provided in which the combined protective coating 3, 30 is made by differentiating the different thicknesses between the two braking surfaces of the braking band.

According to a particularly preferred embodiment, the step d) of depositing for forming the base protective coating 30 comprises two or more distinct deposition stages of the particle chromium carbide on the surface itself to form the protective coating.

In more detail, said step d) of deposition comprises:
a first deposition stage of material in particle form to create a first layer of the base protective coating 30 directly on the disk;
a second deposition step of the material in particle form to create a second layer of the base protective coating on the first layer.

As will be clarified below, the second finishing layer makes it possible to adjust the surface finish of the base protective coating 3.

The division of the step d) of depositing into two stages makes it possible, in particular, to differentiate at least the particle size of the material in particle form used in the various stages. This makes the step d) of depositing more flexible.

Advantageously, the particle material deposited in particle form in the first deposition stage has a particle size greater than that deposited in the second deposition stage. In particular, the particle material deposited in particle form in the first deposition stage has a particle size comprised between 30 and 40 µm, while the particle material deposited in particle form in the second deposition stage has a particle size comprised between 5 and 20 µm.

Making the base protective coating 30 in two distinct deposition stages, using a coarser particle size for the formation of the first layer and a finer particle size for the formation of the second layer (with finishing function), makes it possible to obtain a coating which already at the end of the deposition has the required surface finish features, as a function of the subsequent deposition of the surface protective coating 3. Such desired surface finishing characteristics can be obtained without needing to grind and/or perform other surface finishing operations for the coating. The particles deposited in the second stage fill 1 the coarse roughness on the surface of the base layer. Advantageously, the surface finishing level of the coating can be adjusted by adjusting the particle size of the particles deposited in the second stage.

Preferably, the thickness of the first layer of the protective base coating 30 is comprised between 2/4 and 3/4 of the total thickness of the coating, while the thickness of the second layer of the protective base coating 30 is comprised between 1/4 and 2/4 of the total thickness of the coating.

According to a particularly preferred embodiment of the method, the step e) of depositing of the particle material (WC+Fe+Cr+Al) which forms the surface protective coating 3 comprises two or more distinct deposition stages of the particle material onto the same surface to form the protective coating.

In more detail, said step e) of deposition comprises:
a first deposition stage of the material in particle form to create a first layer of the coating directly on the base protective coating 30; and
a second deposition stage of the material in particle form to create a second layer on the first layer of surface protective coating 3.

Preferably, surface protection layer 3 is subjected to a step of surface finishing to achieve the desired final degree of roughness.

Alternatively, the surface finish of protective layer 3 may be obtained by working directly on the deposition methods of the coating itself 3.

More in detail, similarly to what is envisaged in step d) of depositing of the base coating, also the division of step e) of depositing of the particle material which forms the surface protective coating 3 into two or more stages, in particular, also makes it possible to differentiate between at least the particle size of the particle material used in the various steps. This makes the step e) of depositing more flexible.

Advantageously, the particle material deposited in the first deposition stage has a particle size greater than that deposited in the second deposition stage. In particular, the particle material deposited in the first deposition stage has a particle size comprised between 30 and 40 μm, while the particle material deposited in the second deposition stage has a particle size comprised between 5 and 20 μm.

The embodiment of the protective coating or surface 3 with two distinct deposition stages, using a coarser particle size for forming the base layer and a finer grain size for forming the finishing layer, makes it possible to obtain a surface protective coating 3 which already at the end of the deposition has the required surface finishing features, without the need for grinding and/or performing other surface finishing operations for the coating. The particles deposited in the second stage fill the coarse roughness on the surface of the base layer. Advantageously, the surface finishing level of the surface protection 3 can be adjusted by adjusting the particle size of the particles deposited in the second stage.

In particular, by using particles with a particle size of 30 to 40 μm for the first stage and particles with a particle size of 5 and 20 μm for the second stage, the surface protective coating 3 has at the finishing layer a surface roughness Ra in the range between 2.0 and 3.0 μm.

Preferably, the thickness of the first layer of the surface protective coating 3 is comprised between ⅔ and ¾ of the total thickness of the coating, while the thickness of the second layer of the surface protective coating 3 is comprised between ¼ and ⅔ of the total thickness of the coating.

Overall, the combination of the HVOF, HVAF, or KM deposition techniques of the particle material, of the chemical components used, and the method of depositing in multiple stages makes it possible to obtain a coating with a limited level of surface roughness, particularly adapted for the purposes of use of the brake disk 1.

Comparative tests between the following disks were performed:
- A) a disk brake made of gray cast iron with a "combined" protective coating according to the invention, made by the HVOF technique, with 50 μm thick base protective coating (Cr3C2+NiCr) and 60 μm thick surface protective coating (WC+Fe+Cr+Al); the base protective coating was placed on the disk on a nitrocarburized layer with a depth of 15 μm and hardness values higher than 300 HV in microhardness; the nitrocarburized layer comprised an oxidized top layer comprising magnetite Fe3O4 with a thickness of 5 μm; the nitrocarburized layer was applied to the braking surface, which had previously undergone a treatment designed to increase its roughness; and
- B) a gray cast iron brake disk with a "combined" protective coating, similar to that of the invention, but made directly on the disk without a nitrocarburized layer;

The two disks were subjected to the usual dynamic bench tests (run-in, AK Master and wear).

Such tests showed that, the test conditions being equal, the durability disk A according to the invention is comparable in terms of wear to that of the disk B.

Also from the point of view of tribological behavior (friction, fading, run-in), the test conditions being equal, the performance of the disk according to the invention is substantially comparable to that of a traditional disk B.

The two disks were also subjected to a series of resistance tests in the presence of combined and environmental thermomechanical stresses.

As mentioned, such tests have shown that the performance of the disk according to the invention is better than the disk B in terms of strength in presence of environmental stresses (thermomechanical shocks and corrosive agents).

In greater detail, the two disks were subjected to a test program which envisages the repetition of combined dynamic bench tests (the disk was subjected to different cycles of braking, each with multiple consecutive braking operations) and tests in a corrosive environment (salt spray and condensation water test: disk and brake pads were kept in salt spray and an environment with a high degree of moisture with high-temperature excursions).

At the end of set repetitions, B displayed a generalized removal of the protective coating, while disk A had only a minimal localized detachment of the protective coating.

As can be appreciated from the description above, the disk brake and the method for making such disk brake according to the invention makes it possible to overcome the disadvantages of the prior art.

Indeed, the brake disks made according to the invention are not subject to flaking or are subject to it to a much lesser degree than the known solutions (to ensure in time a wear resistance) and at the same time do not contain cobalt.

The brake disk coated with a nitrocarburized layer according to the invention displayed similar wear resistance and tribological behavior under normal environmental conditions relative to similar coated disks without a nitrocarburized layer.

It was also determined that the brake disk coated according to the invention has the best performance in terms of strength in presence of environmental stresses (thermal shocks and salt attacks).

The brake disk 1 is also generally cost-effective to make.

A person skilled in the art can make numerous changes and variants to the disk and brake disk described above, all contained within the scope of protection defined by the following claims to satisfy contingent, specific needs.

According to a general embodiment, a braking band 2 of a disk for a disk brake 1 is provided.

Said braking band 2 extends between an inner diameter D1, near a rotation axis X-X of the braking band 2, and an outer diameter D2, far from said rotation axis X-X. Said rotation axis defines an axial direction X-X.

Said braking band 2 defines a radial direction R-R, which is substantially orthogonal to said axial direction X-X, and a circumferential direction C-C which is orthogonal both to said axial direction X-X and to said radial direction R-R.

In accordance with a general embodiment, a brake band 2 of a disk brake disk 1 comprises an annular band body 6 arranged about a brake disk rotational axis, or brake disk rotation axis X-X.

Said band body 6 is made of gray cast iron or steel or aluminum or alloys thereof.

Said braking band 2 comprises at least one braking surface 2a or 2b.

At least one portion of said at least one braking surface 2a or 2b comprises an activated band body portion 7 for increasing the adhesive capacity of at least one protective surface coating 3 placed on the surface of said activated band body portion 7.

Said protective surface coating 3 comprises at least one material with elevated resistance to abrasion.

Said activated band body portion 7 is arranged on the surface of said band body 6 to form an outermost layer of the braking band 2 with said at least one protective surface coating 3.

Said activated band body portion 7 comprises a rough profile 8.

Said rough profile 8 comprises at least one groove or channel 9 delimited by at least one pair of projections 10 and/or 11 and/or 12.

Said at least one channel 9 extends along a path, which surrounds, at least partially, said rotation axis X-X.

Said at least one channel 9 has a channel bottom 13 and two opposite channel sides 14, 15 in the cross-section, at the longitudinal extension thereof.

Advantageously, a first channel side 14 forms an acute angle a1 with said the channel bottom 13, i.e. an angle a1 smaller than 90 DEG. A second channel side 15 forms an obtuse angle a2 with said the channel side bottom 13, i.e. an angle a2 larger than 90 DEG.

According to an embodiment, said first and second channel side 14, 15 are mutually parallel sides.

According to an embodiment, said first channel side 14 forms an acute angle a1 of 80 DEG with said channel bottom 13.

According to an embodiment, said second channel side 15 forms an obtuse angle (a2) of 100 DEG with said channel bottom 13.

According to an embodiment, said projection is a first projection 10, which forms undercuts 17 on both projection sides thereof.

According to an embodiment, said projection is a second projection 11, which delimits channel sides 15, both forming obtuse angles a2 with the respective channel bottoms 13.

According to an embodiment, said projection is a third projection 12, which delimits a first channel side 14, forming an acute angle a1 with the channel bottom 13 and a second opposite channel side 15, forming an obtuse angle a2 with the channel bottom 13.

According to an embodiment, said at least one pair of projections 10 and/or 11 and/or 12 is a plurality of projections 20, which alternate, in particular, a first projection 10 and a second projection 11.

According to an embodiment, said at least one pair of projections 12 is a plurality of projections 20, which are all equal, in particular, a third projection plurality 12.

According to an embodiment, said at least one pair of projections 11 and/or 12 is a plurality of projections 20 comprising:

a first plurality of third projections 12 and
a second plurality third projections 12, but this second plurality has a profile, i.e. a cross-section at the longitudinal extension thereof of each projection of said second plurality, opposite the profile of said first plurality; and
a second projection 11 is comprised, interposed between said first and second pluralities.

According to an embodiment, said at least one channel 9 is a first pair of channels 9, set side by side to each other and delimited by a first projection 10 placed between said pair of channels 9; said projection delimits, with both opposite edges thereof, channel sides 14, both forming an acute angle a1 with said channel bottom 13.

According to an embodiment, said at least one channel 9 is a first pair of channels 9, set side by side to each other and delimited by a first projection 10 placed between said pair of channels 9; said projection delimits, with both opposite edges thereof, channel sides 14, forming undercut channel portions 17, i.e. deeper cavities, which form an acute angle a1 with the plane made up of the channel bottom 13.

According to an embodiment, said at least one channel 9 is a second pair of channels, set side by side to each other and delimited by a second projection 11, placed between said channels 9; said projection delimits, with both opposite edges thereof, channel sides 15, both forming an obtuse angle a2 with said channel bottom 13.

According to an embodiment, said at least one channel 9 is a third pair of channels, set side by side to one another and delimited by a third projection 11, placed between said channels set side by side; said third projection 11 delimits, with both opposite edges thereof, channel sides 14, 15, with a first side 14 forming an acute angle a1 with said channel bottom 13, and with a second side 15 forming an obtuse angle a2 with said channel bottom 13.

According to an embodiment, said third projection 11 forms, on both sides thereof, facing said channels 9 set side by side, channel sides 14, 15, parallel to each other.

According to an embodiment, said third projection 11, which forms a first side 14 with an acute angle a1 to said channel bottom 13 has said first side 14 inclined, forming an undercut 17 facing or pointing at said rotation axis X-X.

According to an embodiment, said third projection 11, which forms a first side 14 with an acute angle a1 to said channel bottom 13 has said first side 14 inclined, forming an undercut 17 facing opposite or pointing away from said or pointing at the side opposite said rotation axis X-X.

According to an embodiment, said activated band body portion 7 is two braking band portions comprised in the same braking band 2; wherein only third projections 11 with sides 14, 15 parallel to one another are comprised in a first portion, forming a first side 14 with an acute angle a1 to said channel bottom 13 has said first side 14 inclined, forming an undercut 17 facing or pointing at said rotation axis X-X;

third projections 11 with sides 14, 15 parallel to one another are comprised in a second portion, forming a first side 14 with an acute angle a1 to said channel bottom 13 has said first side 14 inclined, forming an undercut 17 facing opposite or pointing away from said or pointing at the side opposite said rotation axis X-X.

According to an embodiment, a first projection 10 forming undercuts 17 on both sides thereof and a second projection 11 delimiting channel sides 15, both forming obtuse angles a2 with the respective channel bottoms 13, alternate to form a plurality of channels 9 in said rough profile 8.

According to an embodiment, said channel 9 has a depth from 0.05 mm to 0.1 mm, preferably 0.075 mm and a width comprised from 0.5 mm to 0.7 mm.

According to an embodiment, said projection 10 or 11 or 12 has a width which is substantially identical to the width of said channel 9.

According to an embodiment, said channel bottom 13 is a substantially flat surface.

According to an embodiment, said projection 10 or 11 or 12 is delimited externally by a projection ridge 18, wherein said projection ridge 18 is a substantially flat surface.

According to an embodiment, said projection 10 or 11 or 12 is delimited externally by a projection ridge 18 and wherein said channel sides 14, 15 are joined to said projection ridge with a connecting radius from 0.1 mm to 0.4 mm.

According to an embodiment, said channel sides 14, 15 are joined to said channel bottom 13 with a connection and wherein said connection has a connecting radius from 0.01 mm to 0.02 mm.

According to an embodiment, said band body 6 is formed by a base metal selected from gray cast iron or steel, wherein:
- a protective base coating 30, which covers said at least one activated band body portion 7, said protective base coating 30 being formed by chromium carbide Cr3C2 and Nickel-Chrome NiCr, or by Nickel-Chrome NiCr, Iron Fe, Molybdenum Mo, Cobalt Co, Manganese Mn, and Aluminum Al, and being obtained by deposition using the spraying deposition technique, preferably using the HVOF technique High-Velocity Oxygen Fuel, or the HVAF technique High-Velocity Air Fuel or the KM technique Kinetic Metallization; and
- a protective surface coating 3, which covers said at least one activated band body portion 7, said protective surface coating 3 being formed by tungsten carbide WC, iron Fe, chromium Cr, and aluminum Al and being obtained by depositing, on the protective base coating 30, tungsten carbide WC, iron Fe, chromium Cr, and aluminum Al, in particle form, using the spraying deposition technique, preferably using the HVOF technique High-Velocity Oxygen Fuel, or the HVAF technique High-Velocity Air Fuel or the KM technique Kinetic Metallization,
- and wherein the surface of said at least one activated band body portion 7 coated with said protective base coating 3 is defined by a nitrocarburized layer 300 of said base metal and has a rough profile in a radial or circumferential section relative to the center of the braking band.

The present invention further relates to a disk brake disk 1 comprising a braking band 2 as defined by any one of the previously described embodiments and a bell 5 associated with said braking band 2 and adapted to connect to a wheel hub of a vehicle.

The present invention further relates to a vehicle comprising a disk brake disk 1 as described above.

A method for obtaining a braking band according to the invention will be described below.

A method for producing a braking band 2 comprises the following operating steps:
- providing a braking band 2 comprising at least one braking surface 2a or 2b, the braking band 2 being made with a band body 6 of gray cast iron or steel or aluminum or alloys thereof;
- subjecting at least one portion of said at least one braking surface 2a or 2b to processing adapted to increase the surface roughness thereof by means of processing by removing swarf or by laser engraving or by plastic deformation, forming an activated band body portion 7;
- producing said activated band body portion 7 on the surface of said band body 6, making a rough profile 8;
- making said rough profile 8 with at least one groove or channel 9 delimited by at least one pair of projections 10 and/or 11 and/or 12;
- extending said the at least one channel 9 along a path, which surrounds, at least partially, said rotation axis X-X;
- making said the at least one channel 9 so that the cross-section thereof at the longitudinal extension thereof comprises a channel bottom 13 and two opposite channel sides 14, 15;
- making a first channel side 14 so that it forms an acute angle a1 with said channel bottom 13, i.e. an angle a1 smaller than 90 DEG;
- making a second channel side 15 is made so that it forms an obtuse angle a2 with the channel bottom 13, i.e. an angle a2 larger than 90 DEG;
- depositing, on said activated band body portion 7, at least one protective coating 3 and/or 30 and/or 300 and/or 330, comprising at least one material with elevated resistance to abrasion.

According to a further embodiment of the method, there are comprised the further steps of nitrocarburized surface layer 300 on the surface of said activated band body portion 7;
- depositing, on said nitrocarburized surface layer 300, a material, in particle form, made up of:
  - chromium carbide Cr3C2 and Nickel-Chrome NiCr,
  or
  - nickel-chromium NiCr, iron Fe, molybdenum Mo, cobalt Co, manganese Mn, and aluminum Al,
  using the spraying deposition technique, preferably HVOF High-Velocity Oxygen Fuel, or the HVAF technique High-Velocity Air Fuel or the KM technique Kinetic Metallization, forming a protective base coating 30, which covers the surface of said activated band body portion 7 with the interposition of said nitrocarburized layer 300; and
- depositing, on said protective base coating 30, a material, in particle form, made up of tungsten carbide WC, iron Fe, chromium Cr, and aluminum Al, using the spraying deposition technique, preferably HVOF High-Velocity Oxygen Fuel, or the HVAF technique High-Velocity Air Fuel or the KM technique Kinetic Metallization, forming a protective surface coating 3, which is made up of tungsten carbide WC and iron Fe, chromium Cr and aluminum Al and which covers the surface of said activated band body portion 7.

The present invention relates to a tool 21 for producing said activated band body portion 7, comprising at least one cutting edge 22, which comprises a rough profile defining
- at least one cutting edge projection 23 having at least one cutting edge ridge 24, a first cutting edge side 25 and a second cutting edge side 26;
- Evaluated parallel to said cutting edge ridge 24, said cutting edge has a maximum cutting edge projection width 27 smaller than a maximum channel width 16.

According to an embodiment, said tool 21 comprises a plurality of cutting edge projections 28 side by side.

LIST OF REFERENCES 1 brake disk
2 braking band
2a opposite braking surfaces
2b opposite braking surfaces
3 protective surface coating
300 nitrocarburized layer
330 oxidized top layer
4 annular portion or fixing portion
5 connection element or bell
6 band body
7 activated band body portion
8 rough profile
9 channel
10 first projection which forms undercuts on both sides
11 second projection which delimits channel sides, both forming obtuse angles with the respective channel bottoms
12 third projection, which delimits a first channel side, forming an acute angle with the channel bottom, and a second opposite channel side, forming an obtuse angle with the channel bottom.
13 channel bottom 14 first channel side which forms an acute angle with said channel bottom
15 second channel side which forms an obtuse angle with said channel bottom
16 maximum channel width
17 undercut
18 projection ridge
20 plurality of projections
21 tool
22 cutting edge
23 cutting edge projection
24 cutting edge ridge
25 cutting edge first side
26 cutting edge second side
27 cutting edge projection maximum width
30 protective base coating
A-A braking band or brake disk rotation axis
X-X rotation axis or axial direction
R-R radial direction
C-C tangential direction
D1 inner band diameter
D2 outer band diameter

The invention claimed is:

1. A braking band of a disk for a disk brake, said braking band comprising an annular band body arranged around a rotation axis (X-X), said annular band body being made of one of gray cast iron, steel, aluminum or alloys thereof,
said braking band further comprising at least one braking surface,
wherein, at least one portion of said at least one braking surface comprises an activated band body portion for increasing adhesive capacity of at least one protective surface coating placed on a surface of said activated band body portion,
wherein said at least one protective surface coating comprises at least one material with elevated resistance to abrasion,
wherein said activated band body portion is arranged on a surface of said annular band body to form an outermost layer of the braking band with said at least one protective surface coating,
and wherein said activated band body portion comprises a rough profile,
said rough profile comprising at least one channel delimited by at least one pair of projections,
said at least one channel extending along a path that at least partially surrounds said rotation axis (X-X),
and wherein said at least one channel has a channel bottom, and two opposite channel sides in cross section, at a longitudinal extension thereof, namely
a first channel side forming an acute angle with said channel bottom, that is an angle smaller than 90°, and
a second channel side forming an obtuse angle with said channel bottom, that is an angle larger than 90°,
wherein said annular band body is formed by a base metal selected from gray cast iron or steel, wherein:
a protective base coating covers said at least one activated band body portion, said protective base coating being formed by chromium carbide (Cr3C2) and Nickel-Chrome (NiCr), or by Nickel-Chrome (NiCr), Iron (Fe), Molybdenum (Mo), Cobalt (Co), Manganese (Mn) and Aluminum (Al), and being obtained by deposition using spraying deposition techniques, preferably HVOF (High Velocity Oxygen Fuel) technique, HVAF (High Velocity Air Fuel) technique or KM (Kinetic Metallization) technique, and
a protective surface coating covers said at least one activated band body portion, said protective surface coating being formed by tungsten carbide (WC), iron (Fe), chrome (Cr) and aluminum (Al) and being obtained by depositing, on the protective base coating, tungsten carbide (WC), iron (Fe), chrome (Cr) and aluminum (Al), in particle form, using spraying deposition techniques, preferably HVOF (High Velocity Oxygen Fuel) technique, HVAF (High Velocity Air Fuel) technique or KM (Kinetic Metallization) technique,
and wherein the surface of said at least one activated band body portion coated with said protective base coating is defined by a nitro carburized layer of said base metal and has a rough profile in a radial or circumferential section with respect to a center of the braking band.

2. The braking band of claim 1, wherein said first and second channel sides are parallel to each other.

3. The braking band of claim 1, wherein at least one of the following features applies:
said first channel side forms an acute angle of 80° with said channel bottom,
said second channel side forms an obtuse angle of 100° with said channel bottom.

4. The braking band of claim 1, wherein
said at least one pair of projections is a first projection that forms undercuts on both projection sides thereof;
or
said at least one pair of projections is a second projection that delimits second channel sides, both forming obtuse angles with respective channel bottoms;
or
said at least one pair of projections is a third projection that delimits the first channel side, forming an acute angle with the channel bottom and the second channel side, forming an obtuse angle with the channel bottom.

5. The braking band of claim 4, wherein
said at least one pair of projections is a plurality of projections, which alternate, in particular, the first projection and the second projection;
or
said at least one pair of projections is a plurality of projections, which are all equal, in particular, a plurality of third projections;
or
said at least one pair of projections is a plurality of projections comprising
a first plurality of third projections and
a second plurality of third projections, the second plurality of third projections having a profile, that is a cross section at a longitudinal extension of each projection of said second plurality, opposite the profile of said first plurality, and
a second projection, interposed between said first and second pluralities.

6. The braking band of claim 4, wherein at least one of the following features applies:
said at least one channel has a depth from 0.05 mm to 0.1 mm, and a width from 0.5 mm to 0.7 mm;
said first, second or third projection has a width identical to the width of said at least one channel;
said channel bottom is a flat surface.

7. The braking band of claim 4, wherein at least one of the following features applies:
said first, second or third projection is externally delimited by a projection ridge, wherein said projection ridge is a flat surface;

said first, second or third projection is externally delimited by a projection ridge and wherein said first and second channel sides are joined to said projection ridge with a connecting radius ranging from 0.1 mm to 0.4 mm;

said first and second channel sides are joined to said channel bottom with a connection and wherein said connection has a connecting radius ranging from 0.01 mm to 0.02 mm.

8. The braking band of claim 1, wherein a first projection forming undercuts on both sides thereof and a second projection delimiting second channel sides, both forming obtuse angles with respective channel bottoms, alternate to form a plurality of channels in said rough profile.

9. A disk for a disk brake comprising the braking band of claim 1 and a bell associated with said braking band and configured to connect to a hub of a wheel of a vehicle.

10. A vehicle comprising the disk for a disk brake of claim 9.

11. A method for producing a braking band, the method comprising:
providing a braking band comprising at least one braking surface, the braking band being made with an annular band body made of one of gray cast iron, steel, aluminum or alloys thereof;
subjecting at least one portion of said at least one braking surface to a processing for increasing surface roughness thereof by removing swart or by laser engraving or by plastic deformation, forming an activated band body portion;
producing said activated band body portion on a surface of said annular band body, making a rough profile;
making said rough profile with at least one channel delimited by at least one pair of projections;
extending said at least one channel along a path, which at least partially surrounds a rotation axis (X-X);
making said at least one channel so that a cross section thereof at a longitudinal extension thereof comprises a channel body and two opposite channel sides, namely
a first channel side forming an acute angle with said channel bottom, that is an angle smaller than 90°;
a second channel side forming an obtuse angle with said channel bottom, that is an angle larger than 90°; and
depositing, on said activated band body portion, at least one protective coating comprising at least one material with elevated resistance to abrasion,
further comprising:
nitro carburizing said activated band body portion, obtaining a nitro carburized surface layer on the surface of said activated band body portion;
depositing, on said nitro carburized surface layer, a material, in particle form, made up of:
chromium carbide (Cr3C2) and Nickel-Chrome (NiCr), or
Nickel-Chrome (NiCr), Iron (Fe), Molybdenum (Mo), Cobalt (Co), Manganese (Mn) and Aluminum (Al),
using spraying deposition techniques, preferably HVOF (High Velocity Oxygen Fuel) technique, HVAF (High Velocity Air Fuel) technique or KM (Kinetic Metallization) technique, forming a protective base coating, which covers the surface of said activated band body portion with interposition of said nitro carburized surface layer; and
depositing, on said protective base coating, a material, in particle form, made up of tungsten carbide (WC), iron (Fe), chrome (Cr) and aluminum (Al), using spraying deposition techniques, preferably HVOF (High Velocity Oxygen Fuel) technique, HVAF (High Velocity Air Fuel) technique or KM (Kinetic Metallization) technique, forming a protective surface coating made up of tungsten carbide (WC) and iron (Fe), chrome (Cr) and aluminum (Al) and covering the surface of said activated band body portion.

12. A braking band of a disk for a disk brake, said braking band comprising an annular band body arranged around a rotation axis (X-X), said annular band body being made of one of gray cast iron, steel, aluminum or alloys thereof,
said braking band further comprising at least one braking surface,
wherein, at least one portion of said at least one braking surface comprises an activated band body portion for increasing adhesive capacity of at least one protective surface coating placed on a surface of said activated band body portion,
wherein said at least one protective surface coating comprises at least one material with elevated resistance to abrasion,
wherein said activated band body portion is arranged on a surface of said annular band body to form an outermost layer of the braking band with said at least one protective surface coating,
and wherein said activated band body portion comprises a rough profile,
said rough profile comprising at least one channel delimited by at least one pair of projections,
said at least one channel extending along a path that at least partially surrounds said rotation axis (X-X),
and wherein said at least one channel has a channel bottom, and two opposite channel sides in cross section, at a longitudinal extension thereof, namely
a first channel side forming an acute angle with said channel bottom, that is an angle smaller than 90°, and
a second channel side forming an obtuse angle with said channel bottom, that is an angle larger than 90°, wherein
at least one of said pairs of projections comprises a projection with two channel sides, both forming obtuse angles with respective channel bottoms.

13. A braking band of a disk for a disk brake, said braking band comprising an annular band body arranged around a rotation axis (X-X), said annular band body being made of one of gray cast iron, steel, aluminum or alloys thereof,
said braking band further comprising at least one braking surface,
wherein, at least one portion of said at least one braking surface comprises an activated band body portion for increasing adhesive capacity of at least one protective surface coating placed on a surface of said activated band body portion,
wherein said at least one protective surface coating comprises at least one material with elevated resistance to abrasion,
wherein said activated band body portion is arranged on a surface of said annular band body to form an outermost layer of the braking band with said at least one protective surface coating,
and wherein said activated band body portion comprises a rough profile,
said rough profile comprising a plurality of channels and a plurality of pairs of projections,
wherein said plurality of channels comprise individual channels and said plurality of pairs of projections comprise of individual projections, wherein said individual channels are each separated by an individual projection, wherein said plurality of channels extends along a path that at least partially surrounds said rotation axis (X-X), and wherein all of said plurality of channels have a channel bottom, and two opposite channel sides in cross section, at a longitudinal extension thereof, namely a first channel side forming an acute angle with said channel bottom, that is an angle smaller than 90°, and a second channel side forming an obtuse angle with said channel bottom, that is an angle larger than 90°, wherein each individual projection comprises a projection ridge, one first channel side, and one second channel side, wherein all projection ridges are parallel to all channel bottoms, wherein all first channel sides are parallel to all other first channel sides, wherein all second channel sides are parallel to all other second channel sides, and wherein all first channel sides are parallel to all second channel sides.

* * * * *